US 8,655,178 B2

(12) United States Patent
Capron et al.

(10) Patent No.: US 8,655,178 B2
(45) Date of Patent: *Feb. 18, 2014

(54) METHOD AND APPARATUS FOR CLEARING AN OPTICAL CHANNEL

(75) Inventors: Barbara A. Capron, Sammamish, WA (US); William A. McNeely, Redmond, WA (US); Kishan Dholakia, Scotland (GB); Antonia Erika Carruthers, Shetland (GB)

(73) Assignee: The Boeing Company, Chicago, IL (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/367,769

(22) Filed: Feb. 7, 2012

(65) Prior Publication Data
US 2012/0134682 A1 May 31, 2012

Related U.S. Application Data

(63) Continuation of application No. 12/036,975, filed on Feb. 25, 2008, now Pat. No. 8,139,944.

(60) Provisional application No. 60/916,708, filed on May 8, 2007.

(51) Int. Cl.
*H04B 10/00* (2013.01)
*H04B 10/02* (2011.01)

(52) U.S. Cl.
USPC ............................ 398/119; 398/118; 398/130

(58) Field of Classification Search
USPC .................................................. 398/118–131
See application file for complete search history.

(56) References Cited

U.S. PATENT DOCUMENTS

| 7,627,249 | B1 * | 12/2009 | Izadpanah et al. | 398/115 |
| 8,139,944 | B2 * | 3/2012 | Capron et al. | 398/119 |
| 2003/0123882 | A1 * | 7/2003 | Izadpanah et al. | 398/119 |
| 2004/0021949 | A1 * | 2/2004 | Grier et al. | 359/614 |
| 2007/0058686 | A1 * | 3/2007 | Capasso et al. | 372/43.01 |
| 2007/0127926 | A1 * | 6/2007 | Marioni et al. | 398/118 |
| 2008/0121790 | A1 | 5/2008 | Grier | |

OTHER PUBLICATIONS

Little, et al., Optical guiding of microscopic particles in femtosecond and continuous wave Bessel light beams, Optical Society of America, May 31, 2004, pp. 2560-2565, vol. 12, No. 11.

(Continued)

*Primary Examiner* — Daniel Dobson
(74) *Attorney, Agent, or Firm* — Haynes and Boone, LLP

(57) ABSTRACT

A method and apparatus for clearing an optical channel for transmitting data through free space between a first and second location includes a light beam, wherein the light beam has a spatially and/or time-dependent modulated intensity profile, and is substantially collimated so that the intensity profile is conserved over a specified distance of operation. The light beam includes a cross-sectional profile having regions of low and high intensity, portions of which are provided for the transmission of an optical data signal. A light source wavelength and intensity are selected for types of obscurant particles having optical properties whereby the radiation pressure acts on the particles, and the particles may then be either attracted into or repelled from portions of the spatially modulated optical beam, leaving certain portions of the optical channel beam absent of obscurant particles, thereby enabling transmission of optical data through the cleared optical channel with low attenuation.

20 Claims, 8 Drawing Sheets

(56) References Cited

OTHER PUBLICATIONS

Jesacher, et al., Size selective trapping with optical "cogwheel" tweezers, Optical Society of America, Aug. 23, 2004, pp. 4129-4135, vol. 12, No. 17.

Dholakia, Kishan, Interference patterns for advanced optical micromanipulation, Proceedings of SPIE, Aug. 1, 2004, pp. 1-6, vol. 5531, Bellingham, WA.

Patterson, et al., Cell sorting in a static optical potential landscape, Proceedings of SPIE, 2005, pp. 59301M1-M-59301M3, vol. 5930, Bellingham, WA.

Summers, et al., Optical guiding of aerosol droplets, Optical Society of America, Jul. 10, 2006, pp. 6373-6380, vol. 14, No. 14.

Kim, et al., Availability of Free Space Optics (FSO) and hybrid FSO/RF systems, Optical Wireless Communications IV, 2001, p. 84, vol. 4530.

Bennett, et al., Quantum public key distribution system, IBM technical disclosure bulletin, Dec. 1985, pp. 3153-3163, vol. 28, No. 7.

Bennett, et al., Quantum cryptograhy; public key distribution and coin tossing, Int'l Conf. on Computers, Systems & Signal Processing, Dec. 10-12, 1984, p. 85, Bangalore, India.

Boulder Nonlinear Systems—Technology in a New Light, printout from http://www.bnonlinear.com/, Mar. 28, 2008.

Razavi, et al., Wireless Optical Communications via Diversity Reception and Optical Preamplification, IEEE Transactions on Wireless Communications, 2005, p. 975, vol. 4, No. 3.

McGloin, et al., Diffraction-free Bessel beams expand the power of optical tweezers, SPLE's oemagazine, Jan. 2003, pp. 42-45.

Ashkin, A., History of Optical Trapping and Manipulation of Small-Neutral Particle, Atoms, and Molecules, IEEE Journal on Selected Topics in Quantum Electronics, Nov./Dec. 2000, pp. 841-856, vol. 6, No. 6.

Sarkisov, et al., Cloud-cover mitigation of the influence of atmospheric turbulence on propagation of laser beams, Proceedings of SPIE, pp. 151-161, vol. 5712, Bellingham, WA, Jan. 22, 2005.

Friese, et al., Atom motion in Laguerre-Gausslan doughnut beams, Quantum Electronics & Laser Science Conference, Post Conference, Technical Digest, May 6, 2001, pp. 219-220, Baltimore, MD.

\* cited by examiner

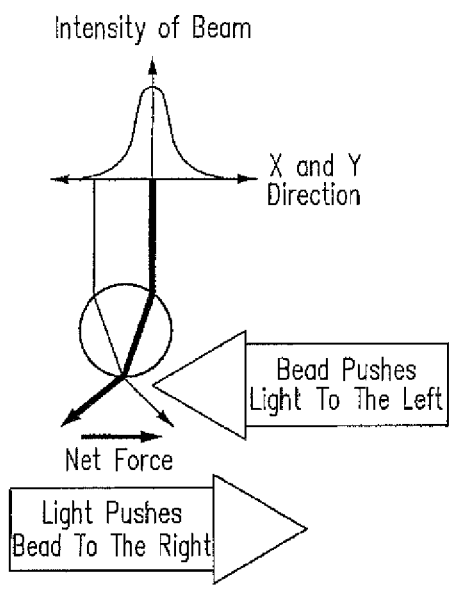
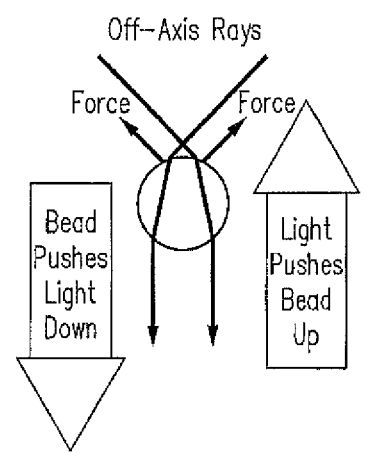
FIG. 1A
(PRIOR ART)
FIG. 1B

METHOD AND APPARATUS FOR CLEARING AN OPTICAL CHANNEL

CROSS-REFERENCE TO RELATED APPLICATIONS

This continuation patent application claims the benefit of and priority to U.S. patent application Ser. No. 12/036,975, filed Feb. 25, 2008, now U.S. Pat. No. 8,139,944, issued Mar. 20, 2012, which and claims the benefit of and priority to U.S. Provisional patent application Ser. No. 60/916,708, filed May 8, 2007, which are incorporated herein by reference in their entirety.

TECHNICAL FIELD

The present disclosure relates generally to free space optical signal transmission.

BACKGROUND

Optical transmission is a key requirement in many existing systems. There is often a need for transmission of optical signals or energy through free space. Such systems cover a wide range of applications in many fields related to data communications, metrology, energy delivery, sensor systems, and medical instrumentation.

Key to the performance of such systems is the ability to propagate the optical energy through the medium in which the system operates. For many systems the medium consists of the atmosphere for a free-space communication system. Several properties of the atmosphere conspire to limit optical transmission, including atmospheric absorption, scattering (together known as extinction) and turbulence. In particular, clouds, fog, rain, dust, aerosols and smoke are especially detrimental to optical transmission.

Certain communications technologies in development rely on ultra-low low intensity beams, approximating single photon transmission, in which case extinction may be especially serious. These technologies may benefit from methods of transmission that reduce propagation loss.

Depending on the strength of extinction and turbulence, the strength of the optical beam may be attenuated, and other characteristics, such as direction and beam size, may also be adversely affected. In conventional attempts to overcome the limiting factors, a system may be built using more power (i.e., more energy projection) or made larger (e.g., with a larger aperture detector to recover more of a spreading beam).

Other methods may be employed to minimize or eliminate some of the problems. For example, in spatial diversity, multiple transmitters or receivers may be used to enhance transmission probability. Another solution for free space communications consists of a so-called hybrid system that employs a combination of both optical and either radio frequency (RF) or microwave (MW) beams (e.g., wavelength diversity). In wavelength diversity, an RF/MW frequency is used when necessary to transmit through a degraded optical channel. This method works because electromagnetic waves are most efficiently scattered by particles approximately the size of the wavelength. Hence, longer wavelengths, such as RF, are not as affected by smaller particle obscurants, such as aerosol or water droplets. However, in general, RF/MW data transmission rates are much lower due to the lower frequencies and require larger apertures to capture the more highly dispersive beams.

In any of these cases, the solution requires more equipment, complexity, weight, and size and results in higher cost of the overall system, simply because of duplication in many components.

As a result, there is a need for systems and methods for creating a low loss optical channel for free space communications that is compact, and low in cost and energy requirements.

SUMMARY

In accordance with various embodiments of the present disclosure, methods and systems are described that may enable clearing of obscurants from an optical path and may be an enabling technology for free-space communication or in adverse atmospheric conditions.

In one embodiment, a method of clearing an optical channel for optically transmitting data through free space between a first location and a second location provides a clearing channel light beam of a wavelength selected based on the optical properties of the obscurant particles and the behavior of the obscurant particles when subjected to the radiation pressure of the light beam. The clearing channel light beam is spatially modulated to have a given intensity profile, wherein the profile includes regions of low and high intensity. The clearing channel light beam is collimated such that the intensity profile is substantially conserved over a specified distance range of operation. The light beam is projected from a first location to a second location. The clearing channel light beam shape is such that obscurant particles are attracted into the high intensity portions of the spatially modulated light beam, leaving low intensity portions of the clearing channel light beam clear of the obscurant particles.

In accordance with another embodiment, the clearing channel light beam may be formed in a shape described mathematically as including Bessel, Laguerre-Gaussian, or equivalents, where the clearing channel light beam has profile regions of low and high intensity.

In accordance with another embodiment, an optical data channel is provided within the minimum intensity portion of the center of the clearing channel light beam. Transmission of the optical data channel may take place from the first location to the second location or from the second location to the first location, where the clearing channel light beam is provided by one of the first or second locations.

In accordance with another embodiment, the spatially modulated clearing channel light beam profile may be temporally modulated in the radial direction, wherein the spatial pattern of the light beam expands from the center outwardly, removing the obscurant particles from the center of the light beam, maintaining a clear channel for the optical data signal beam.

In accordance with another embodiment, the spatially modulated light beam may be time independent, wherein the spatial pattern of the clearing channel light beam removes the obscurant particles from the center of the light beam continuously, maintaining a clear channel for the optical data signal beam.

In accordance with another embodiment, a method of clearing an optical channel for optical transmission of data provides a clearing channel light beam which has a time independent spatially modulated intensity profile. The clearing channel light beam is collimated so that the intensity profile is substantially conserved over a specified distance range of operation. The profile of the clearing channel light beam includes regions of low and high intensity in a cross-sectional area, portions of which are provided for the transmission of an optical data signal. The clearing channel light beam has a wavelength selected such that the obscurant particles have optical properties whereby the radiation pressure acts on the obscurants such that they are repelled from the high intensity portion of the spatially modulated optical beam, leaving the region absent of obscurant particles and thus clear for transmission of optical data. The clearing channel light beam is generated at one location and directed to a second location. An optical data channel is introduced to propagate within the cleared channel between the two locations. Transmission of the optical data signal beam may take place in either direction.

In accordance with another embodiment, a method of clearing an optical channel for optical transmission of data provides a clearing channel light beam which has a spatially modulated intensity profile which is also time-dependent spatially modulated. The clearing channel light beam is collimated so that the intensity profile and its dimensions are substantially conserved over a specified distance range of operation. The profile of the light beam includes regions of low and high intensity in a cross-sectional area portions of which are provided for the transmission of an optical data signal. The clearing channel light beam has a wavelength selected such that the obscurant particles have optical properties whereby the radiation pressure acts on the obscurants such that they are attracted into the high intensity portion of the spatially modulated clearing channel light beam, leaving the region absent of obscurant particles and thus clear for transmission of optical data. The time-dependant spatially modulated beam is adapted to sweep obscurant particles from a region of the optical beam on a periodic and/or continuous basis related to the time-dependent modulation. The clearing channel light beam is generated at one location and directed to a second location. An optical data signal beam is introduced to propagate within the cleared channel between the two locations. Transmission of the optical data signal beam may take place in either direction.

In accordance with another embodiment, a method of clearing an optical channel for optical transmission of data provides a clearing channel light beam which has a spatially modulated time-independent intensity profile. The light beam is collimated so that the intensity profile is substantially conserved over a specified distance range of operation. The profile of the clearing channel light beam includes regions of low and high intensity in a cross-sectional area portions of which are provided for the transmission of an optical data signal. The light beam has a wavelength selected such that the obscurant particles have optical properties whereby the gradient force and radiation pressure act on the obscurants such that they are repelled from the high intensity portion of the spatially modulated optical beam, leaving the region absent of obscurant particles and thus clear for transmission of optical data. The time-dependant spatially modulated beam is adapted to actively sweep obscurant particles from a region of the optical beam continuously on a periodic and/or continuous basis related to the time-dependent modulation. The clearing channel is generated at one location and directed to a second location. An optical data signal beam is introduced to propagate within the cleared channel between the two locations. Transmission of the optical data signal beam may take place in either direction.

In accordance with another embodiment, a method of clearing an optical channel for optical transmission of data provides a clearing channel light beam to clear an optical channel of obscurant particles, where the particles removed include water droplets in clouds and fog, dust, smoke, and aerosols of various types.

In accordance with another embodiment, a system and apparatus for clearing an optical channel for optical transmission of data includes a clearing channel light beam, a beam-forming optical element for shaping the beam spatially and statically in time, a beam collimating element for shaping the beam in a collimated shape for maintaining a substantially fixed dimensional profile over a specified distance range, and an optical element for inserting an optical data signal beam for propagation of optically transmitted information within the clearing channel light beam. The optical data signal generating apparatus may be co-located with the first location channel clearing apparatus, or it may be at the second location, and the optical data signal beam may be transmitted in either direction.

In accordance with another embodiment, a system and apparatus for clearing an optical channel for optical transmission of data, where a channel clearing light beam and an optical data signal beam have substantially the same wavelengths, includes a beam splitter for separating portions of a light beam into the channel clearing light beam and the optical data signal beam, a beam modulator for time division separation of the two beams temporally, a data signal modulator for imposing data modulation on the optical data signal beam, and a beam combiner/splitter for recombining the two beams.

In accordance with another embodiment, a system and apparatus for clearing an optical channel and optical transmission of data includes a first light source, a second light source providing a second light beam, wherein the wavelengths of the two light sources are substantially different, a beam-forming optical element for shaping a channel clearing light beam from the first light source both spatially and dynamically in time, a beam forming element for shaping the beam in a collimated shape for maintaining a substantially fixed dimensional profile over an extended range, a signal modulator means for imposing data on the second light beam light source to provide an optical data signal beam, and an optical element for inserting the optical data signal beam for propagation of optically transmitted information within the cleared channel light beam.

In accordance with another embodiment, a system and apparatus for receiving data transmitted over an optical data signal beam through a clearing channel light beam, wherein the clearing channel light beam and the optical data signal beam have substantially different wavelengths, includes an optical detector, a spatial filter, a wavelength discriminating filter and/or beam splitter for separating the clearing channel from the data channel, a beam-forming optical element for collecting the transmitted data channel, and a detector for receiving and processing the data.

In accordance with another embodiment, a method for clearing obscurants from and communicating data through a communication channel comprises selecting a wavelength for a channel clearing beam of light based on a desired behavior of the obscurants when subjected to optical trapping forces exerted on the particles when irradiated with the channel clearing beam. The channel clearing beam is transmitted through the channel so as to clear the obscurants from selected portions thereof For example, a data signal beam of light is also transmitted through the channel, and one or more of the polarization, shape, intensity and time of occurrence of one or both of the channel clearing beam and the data signal beam are modulated in such a way that respective portions of the two beams having one or more of substantially the same polarizations, shapes, intensities and times of occurrence do not occupy the same portion of the channel at the same time. As another example, one or more of the wavelength, polarization, shape, intensity and/or time of occurrence of one or both of the channel clearing beam and the data signal beam are modulated such that the obscurants are substantially unaffected by the data beam, and the channel clearing beam and the data beam are mutually incoherent and/or do not occupy the same portion of the channel at the same time.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

FIGS. 1A and 1B illustrate the concept of optical trapping.

DETAILED DESCRIPTION

Figure 2:
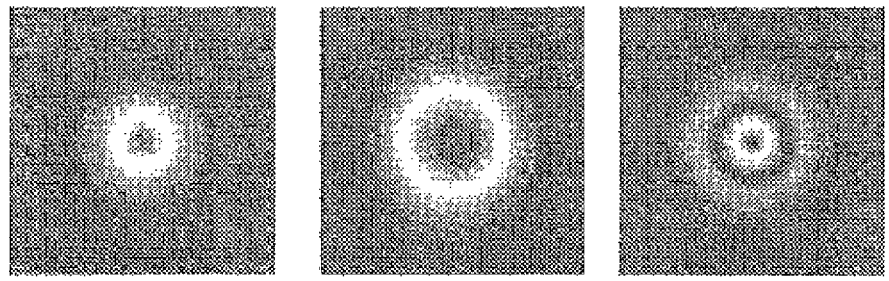
FIG. 2 illustrates examples of optical beams with on-axis minima.

In free space communication, the atmosphere severely limits the ability to transmit optical wavelength photons because of obscuration from aerosols and particles in the air.

As described herein, various embodiments in accordance with the present disclosure may utilize novel adaptations of optical trapping and beam wave front shaping to create a low-loss channel for optical transmission.

Its use may cover a wide range of applications such as, for example, between communication points within a building, between buildings, and between ground station sites and airborne sites, such as a manned or an unmanned aerial vehicle (UAV). Data security may be strongly enhanced because the transmission path is narrowly directed and not easily intercepted without also providing an indication that interference is occurring.

Related techniques as will be described have been used for the past decade in optical "tweezers" experiments and methods to manipulate and move microscopic particles, including biological and molecular structures and are adapted herein to provide novel use. The methods and systems disclosed herein rely on the combination of the basic physics of the phenomenon known as optical trapping and various unique properties of light, such as propagation invariance, self-healing, and on-axis minima associated with certain types of optically shaped beams to provide novel applications in accordance with the present disclosure. The unique combination of optical trapping and beam shaping is available using technologies such as lasers, optics, holograms, spatial light modulators (SLMs) and acoustic-optic deflectors (AODs) to manipulate, move and clear obscurants from an optical path (channel), thus reducing optical attenuation.

The conditions for optical control of atmospheric obscurants depend on a number of factors. Mean atmospheric conditions (e.g., temperature and pressure, density of obscurants) may be important. The obscurants found in the atmosphere may possess a range of optical refractive index, transparency and absorption that vary with optical wavelength. Shape and mass are also relevant parameters. These may determine whether a particle is drawn into the high intensity portion of a beam or repulsed from it, and the ratio of optical pressure (i.e., resulting force) to particulate mass will determine the acceleration, terminal velocity and rate of motion in response to optical radiation pressure and the optical gradient force.

Systems and methods are disclosed herein to provide means to clear an optical channel by using novel optical beams. Such optical beams may be shaped to enhance the optical pressure that may be produced to control the accumulation or displacement of particles in the path defined by the optical channel. A non-uniform beam with sufficient gradients in intensity will create optical pressures capable of moving particles. For example, an optical beam may be formed to have a Laguerre-Gaussian or Bessel profile with sufficient intensity that it may sweep light scattering obscurant particles, such as water droplets and aerosols, out of the optical channel path. Various Bessel orders of such beams, for example, may have either a maximum or a minimum of optical intensity at the on-axis center of the beam. For obscurant particles that are attracted to a high intensity portion of a beam, it may be advantageous to form a beam with an intensity minimum at the center, and to attract such particles away from the on-axis center, thus creating a "pipe" for low-loss light transmission. In other cases, where the optical nature of the obscurant particles may be such that they are repelled from high intensity regions of a light beam, it may be advantageous to form a channel clearing beam with a maximum at the center. Other beam shapes, classified according to a variety of mathematical definitions, may be considered equivalent and also be employed, and may generally have either of the two intensity profile features mentioned, i.e., a central maximum or minimum. Dependence of the responding behavior of obscurants on their optical properties as a function of wavelength determines the preferred profile for the clearing channel beam.

By periodically clearing the optical spatial channel, transmitting the desired information, and re-clearing the channel as necessary, this technique may enable optical signals that otherwise would be quickly attenuated to be transmitted over large distances. The optical clearing beam may be static or dynamic. A static beam would continuously clear the channel. Alternatively, it could be periodically pulsed. A dynamic beam may change its shape and/or intensity, in order to be effective in sweeping a broad range of obscurant particle types out of the channel.

To be effective for a particular application, the beam profile and intensity must be maintained within specified operational limits. Thus, for example, where free space communication is required between two buildings, the operational range/distance may be on the order of several tens to hundreds of meters. Longer range applications may have more stringent requirements. The clearing channel would be required to stay within a certain beam width or diameter over the specified distance to satisfy energy density requirements or receiver aperture limits.

A conventional means for specifying the size of a beam with respect to a Gaussian profile is to state the diameter at which the beam power density falls to $(1/e)^2$ of the peak value (nominally at Gaussian beam center). Since the channel clearing beams described in accordance with embodiments of the present disclosure need not be Gaussian and may have a power density null at the center, it may be convenient to define a nominal beam waist diameter differently. The definition to use may be the diameter, measured radially, at which the power density of the first lobe (i.e., first ring) of the channel clearing beam falls to $(1/e)^2$ of the peak value of the lobe, and require that the peak value of the lobe equal or exceed a minimum power density over the operational distance. Another requirement may be that the $(1/e)^2$ beam waist size spreading does not exceed a specified value over the operational distance. A similar requirement for intensity profile may be specified for the central portion of a beam having a central minimum, as it may be preferred to have a satisfactory gradient in the channel clearing beam intensity, measured from the beam center to the maximum of the first lobe, to effectively "sweep" obscurant particles away from the center, creating the data communication channel "pipe."

The fundamental concept of optical trapping is illustrated in FIGS. 1A and 1B. In FIG. 1A, a light beam with a Gaussian intensity distribution is focused on a spherical "bead." The bead may be representative of a water vapor droplet, aerosols, dust or other atmospheric particles that are mainly responsible for scattering light. In this example, the optical beam is refracted, and thus deflected to the left, which results in development of a force that pushes the bead to the right due to the net dipole force. The bead will eventually come to rest directly in line with the intensity maximum at the center of the beam, where net deflection forces laterally (i.e., x and y) are balanced. Thus, the bead becomes "trapped" at the maximum of the Gaussian beam.

In FIG. 1B, a bead is vertically trapped due to the light force as follows: Consider two Gaussian beams configured to converge initially at a point in front of the bead. The bead will be drawn to the maximum intensity point(as explained for x-y trapping) at the intersection of both beams, which is generally upward, but also has lateral components pertaining to each beam, since each beam is directed at an angle toward the particle. The two horizontal components of force may cancel, leaving a net upward vertical force. The bead experiences a net vertical force upward until the point of convergence of the two beams reaches a point substantially near the center of the bead, at which point the net vertical forces of the incident and exiting beams may cancel. In this circumstance, the bead is "trapped" in the z-direction as well as the x-y direction. A single beam that converges to a focal point will similarly trap the bead at the focal point, i.e., the point of highest optical power density.

While conventional optical trapping generally uses highly focused Gaussian beams, adapting the shapes of such light beams may be more useful for control of particles that affect light transmission. Beams shaped to have one or more intensity minima and one or more high intensity maximum may be configured to displace particles from a region of free space through which optical transmission is sought. For example, FIG. 2 illustrates examples of Laguerre-Gaussian (LG) profile beams, where intensity profiles may have on-axis minima and consist of a series of concentric rings. Beams shaped in this manner may be used to trap particles in the high intensity portion of the ring(s) and remove particles from the central minimum portion. LG and Bessel beams are two examples of beam types that exhibit such shape properties and that may be adapted for this purpose.

Figure 3:
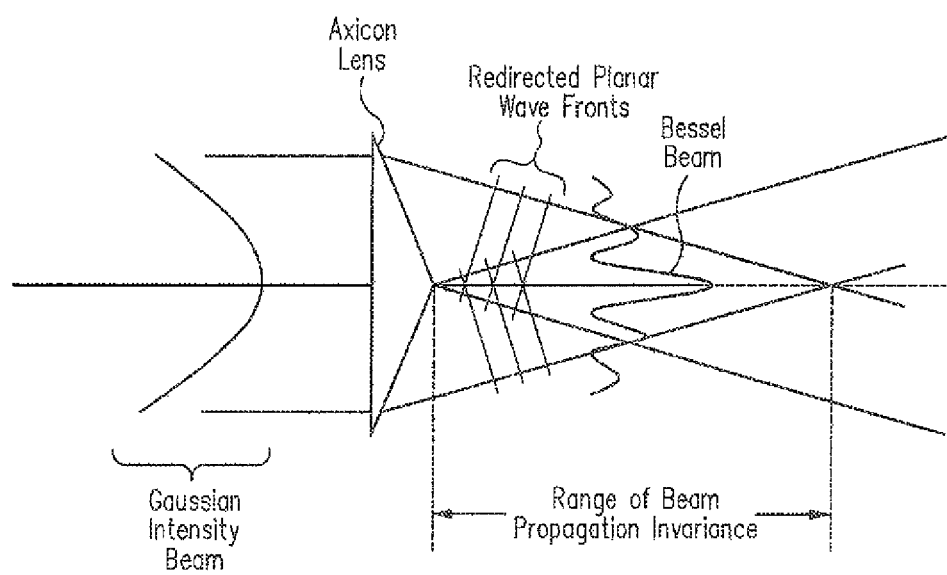
FIG. 3 illustrates the property of beam invariance for propagation over extended distances.

Another useful property is exhibited by beams such as, or similar to, Bessel beams—that of beam propagation invariance. This is illustrated in FIG. 3 where the beam maximum substantially maintains its shape during propagation for a longer distance than is generally observed from diffraction of plane optical waves. This property arises because the beam is constructed from a non-planar ensemble of waves with an altered propagation wave front. That is, the waves may move on a conical surface. This property may be useful for beam trapping throughout a long channel path.

Figure 4:
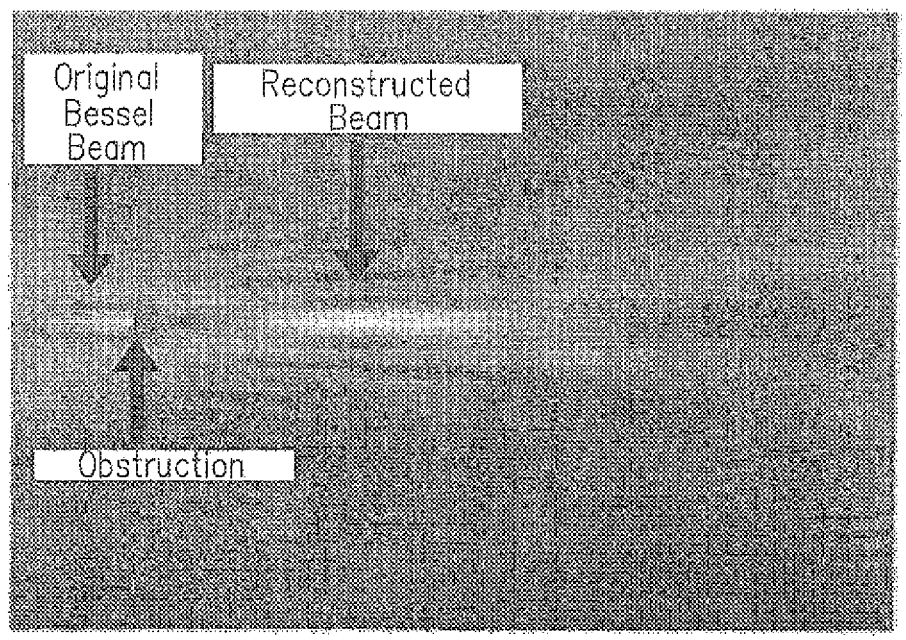
FIG. 4 illustrates the effect of self-healing in certain types of beams, such as Bessel light modes and other modes with conical wave vectors.

Some beams that exhibit propagation invariance also have another unique and useful property—that of self-healing. This is illustrated in FIG. 4. With these beams, although a portion of the beam is blocked by an obscurant particle, as it propagates past the particle, the beam self-heals and restores itself to substantially its original configuration. The advantage of this property is that the beam continues to perform the channel clearing function even as it propagates through a scattering medium in the atmosphere.

One embodiment of the concept may be to use a static beam, such as illustrated in FIG. 2. The beam shape may be spatially static, but the beam itself could be pulsed on and off periodically to clear the channel, since particles that drift into the higher intensity regions may be trapped and swept from the center of the channel. Then, once the channel is cleared, a signal beam (at the same or a different wavelength) may be transmitted down the cleared channel. When the clearing beam is turned off, particles will drift back into the channel. When the transmission becomes critically attenuated below a level specified for an application, the clearing beam may be used again. This is an example of time division multiplexing of the channel clearing beam and the data channel beam.

Specialized beams, such as LG and Bessel beams (and others exhibiting similar features), may be created with spatial light modulators (SLMs) that act as real-time holograms. One vendor of such devices is Boulder Nonlinear Systems (Lafayette, Colo.). Other devices that may be used to dynamically configure beams in this manner are acousto-optic deflectors (AODs) and acousto-optic modulators (AOMs). Newer SLMs may be programmed to change their configuration rapidly and hence modify the beam configuration rapidly. Thus, one could imagine a donut shaped beam whose radius starts small and gradually increases. Such a beam may be used to sweep particles radially out of the center of the channel.

Figure 5:
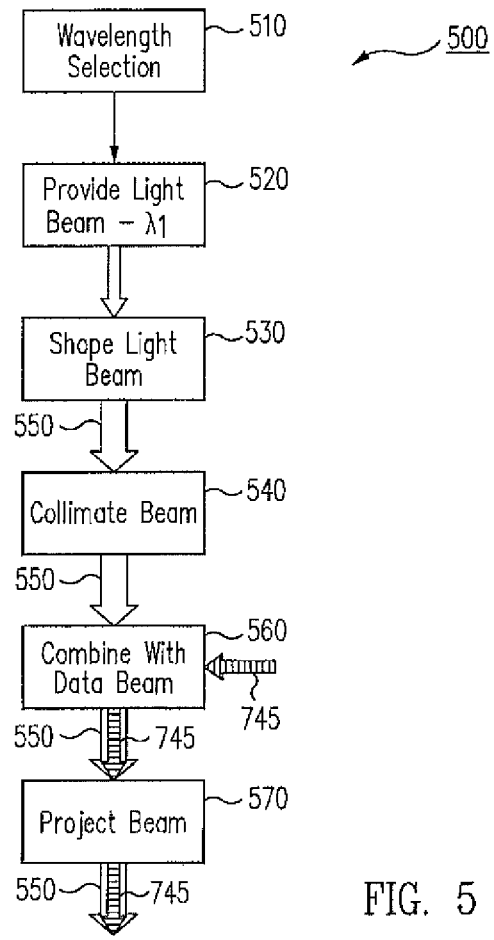
FIG. 5 illustrates a process of forming a free space optical channel in accordance with an embodiment of the present disclosure.

FIG. 5 is a process flow illustrating a method 500 of forming a free space optical channel in accordance with an embodiment of the present disclosure. A light source wavelength $\lambda_1$ is selected (block 510) whereby obscurant particles will react to the light radiation pressure in a known way based on the optical properties of the obscurants. A light source may include a laser or another light source. In the case of a laser, however, the coherent nature of the laser beam results in a higher optical power density than with incoherent light, and may therefore be advantageous. A light beam of the selected wavelength (or wavelengths) is provided by a light source (block 520) at a first location (not shown). The light beam is shaped (block 530) by an appropriate optical element (not shown), such as a hologram, axicon, customized lens, SLM, AOM or an equivalent device that appropriately alters the beam wave front, providing a shaped beam. The shaped beam is then substantially collimated (block 540) to provide a channel clearing beam 550 for propagation over a distance suitable for the application and to minimize loss of optical power efficiency in the clearing channel due to lateral spatial dispersion as the beam propagates.

A beam combining element, such as, for example, a beam splitter/combiner, is placed in the beam (block 560) to enable introduction of a data channel signal 745 (as described with reference to FIG. 7, below), positioned to propagate through the channel formed by the channel clearing beam 550. The beam splitter/combiner, the polarization of the channel clearing beam 550 and the polarization of the data channel signal 745 may be configured such that channel clearing beam 550 and data channel signal are combined to propagate with orthogonal polarizations. The data channel signal is presumed to be a well collimated beam as well, subject to the same beam spatial dispersion constraints as the channel clearing beam 550. The combined data channel signal and channel clearing beam 550 may be further directed (block 570) by a beam projector toward a second location (not shown), where it is received.

The intensity of the data channel signal 745 may be specified to be less than a maximum intensity such that substantially no particle clearing from the optical channel is caused by the data channel. Therefore, only the channel clearing beam may provide the channel clearing function.

Figure 6:
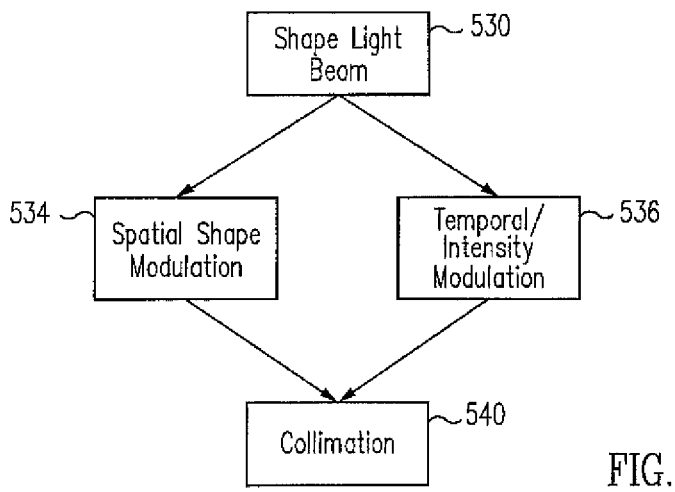
FIG. 6 illustrates a process of shaping a channel clearing beam spatially and temporally, in accordance with an embodiment of the present disclosure.

FIG. 6 illustrates one embodiment of shaping a channel clearing beam spatially and temporally, which may be used in block 530 of FIG. 5. Beam shaping (block 530) may include two distinct processes, namely, spatial shape modulation (block 534) and temporal/intensity modulation (block 536), which may be performed in parallel, serially, or individually to the exclusion of one or the other of blocks 534 and 536. Spatial shape modulation (block 534) may be accomplished with the use of an SLM (not shown) or similar devices (described below) to reshape the wave front of the light beam, which is typically provided initially as a plane wave.

The resulting beam may take various forms in detail, such as a Bessel or Laguerre-Gaussian beam, or other beams of higher order (not shown), that have the property of being a non-planar wave wherein the central portion of the beam may have either an optical null (minimum) or a maximum, as desired, with alternating surrounding regions of minimum and maximum optical intensity. These beams have various advantages, such as propagation invariance and self healing, as described above.

The light beam may be further modulated in time (i.e., temporally) (in block 536) to variously turn channel beam 550 on or off, vary the intensity, or to vary the shape over time. These functions may have the advantage of clearing a variety of obscurant particles of varying types and properties.

Figure 7:
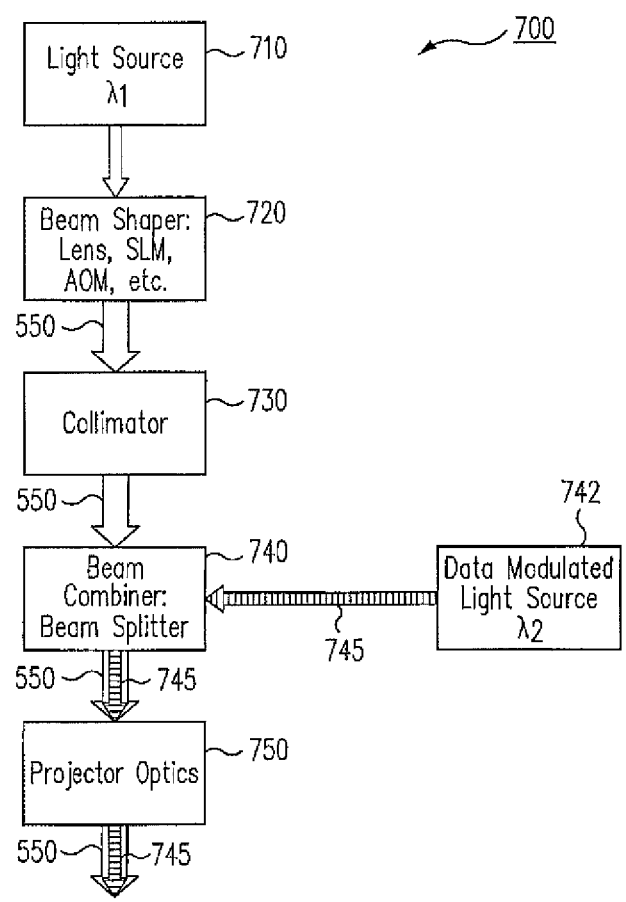
FIG. 7 is a block diagram indicating components of an apparatus for generating a channel clearing beam and transmitting a data signal in accordance with an embodiment of the present disclosure.

FIG. 7 is a block diagram indicating the components of an apparatus 700 for generating a channel clearing beam and transmitting a data signal in accordance with an embodiment of the present disclosure. A light source 710 provides a beam of suitable wavelength $\lambda_1$ and power, selected according to the optical properties of the atmospheric obscurant particles. More than one light wavelength may also be provided, for example, by using more than one light source, or by operating a light source in multi-wavelength mode.

Beam shaping optics 720 receives the light beam and alter the wave front to provide a beam suitable for channel clearing. Optics that may be used for this purpose include axicons and other specialized lenses, SLMs, AOMs, AODs, holograms, or equivalent structures that alter the phase of the light wave front to produce a beam with a modulated intensity profile, and may additionally have the properties of propagation invariance and self-healing. For example, Bessel beams (not shown) are circular, and may have a minimum or maximum at the center of the axis of propagation, and may have one or more rings of maximum and minimum intensity. Laguerre-Gaussian (LG) beams (not shown) have substantially the same characteristics, and may differ only in detail.

For example, the beam formed, i.e., channel clearing beam 550, may have the shape of one or more rings, as shown in FIG. 2, with an optical null (minimum) in the center. The resulting beam is then substantially collimated and sized with appropriate collimator/sizing optics 730, such as lenses, focusing mirrors, or the equivalent, to provide a beam of suitable diameter. In accordance with one embodiment of the present disclosure, where the channel clearing beam 550 is formed with a minimum at the beam center, a beam splitter/combiner 740 may be placed in the path of the channel clearing beam 550 to permit a data channel signal beam 745 that may be of a different wavelength $\lambda_2$ provided from a data modulated light source 742 to be introduced at the center of the channel clearing beam 550 and directed to propagate collinearly with the channel clearing beam 550. The combined beam may then be further directed with a projection optics 750 from the first location (not shown) of the apparatus 700 to the second location (not shown), where the data channel signal beam 745 and channel clearing beam 550 are received and separated.

Figure 8:
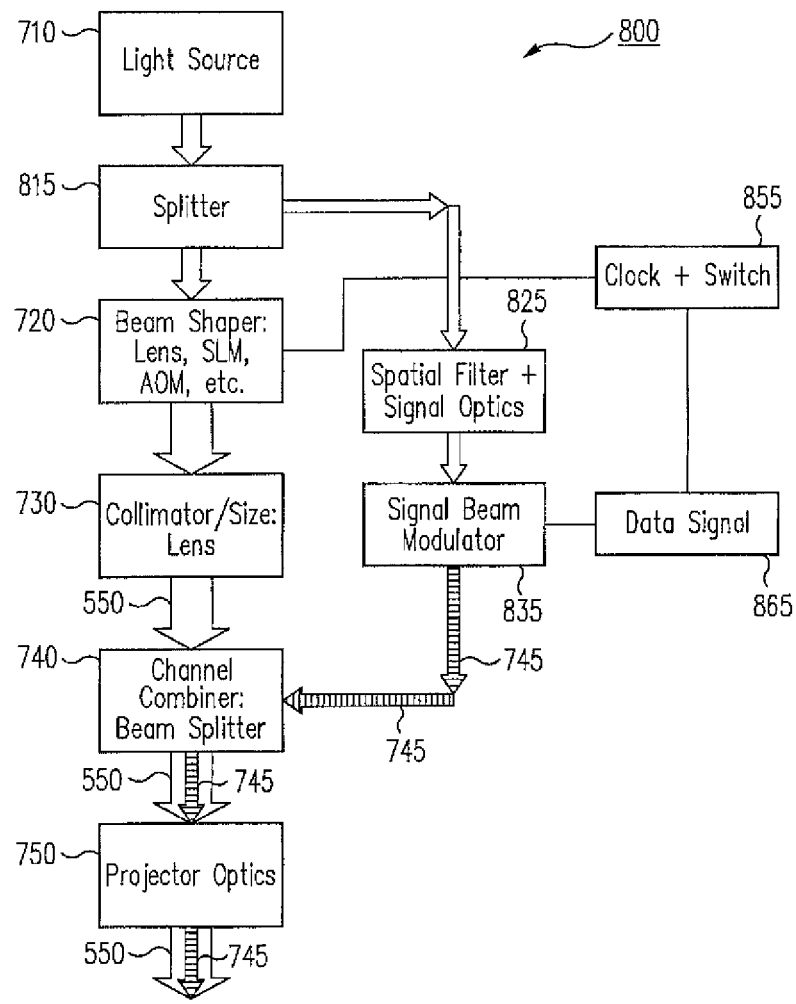
FIG. 8 is a block diagram indicating components of an apparatus for generating a channel clearing beam and transmitting a data signal in accordance with another embodiment of the present disclosure.

FIG. 8 is a block diagram indicating the components of an apparatus 800 for generating a channel clearing beam and transmitting a data signal in accordance with a second embodiment of the present disclosure. The light source 710, beam shaper 720, collimator/sizing optics 730, beam splitter/combiner 740, and projection optics 750 function substantially in the same manner as in the apparatus 700. In this case, however, a splitter 815 extracts a fraction of the beam from the light source 710. The extracted portion is subjected to spatial filtering, beam control and preparation by a group defined collectively as signal optics 825 for transmission through a signal modulator 835 that imposes data on the extracted beam fraction.

A clock switch 855 operates to alternately turn on the beam shaper 720 and impose a clocking pulse on the shaped beam, and trigger a data signal generator 865 to operate a signal modulator 835. Thus, by time division multiplexing, one light source 710 is used to provide a light source for the clearing channel beam 550 and the data signal channel beam 745. In this case, the two beams may not be operational simultaneously. Further components defined by the signal optics 835 direct a modulated data channel signal beam 745 to the beam splitter/combiner 740, where it is introduced collinearly with the channel clearing beam 550. The combined beams are then directed via the projection optics 750 from the first location of the apparatus 800 to the second location (not shown), where the data channel signal beam and channel clearing beam are received and separated.

Figure 9:
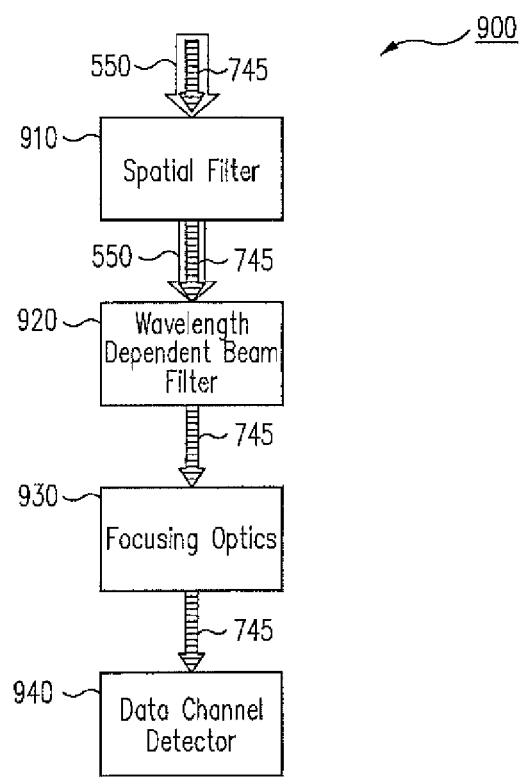
FIG. 9 is a block diagram indicating components of an apparatus for receiving a data signal transmitted through a channel clearing beam, in accordance with the embodiment shown in FIG. 7.

FIG. 9 is a block diagram indicating the components of an apparatus 900 for receiving a data channel signal beam 745 transmitted through a channel clearing beam 550, in accordance with the embodiment of the present disclosure shown in FIG. 7. A spatial filter 910 may optionally be provided to remove all or a substantial portion of the clearing channel beam 550 of wavelength This is advantageous in reducing the relatively higher energy content of the channel clearing beam 550 that would otherwise reach the detector, adversely masking the content of the smaller amplitude data channel signal beam 745.

A wavelength dependent filter 920 is selected and placed to substantially block all of wavelength $\lambda_1$, further reducing or removing remnants of channel clearing beam 550. The wavelength dependent filter 920 may include a thin film optical filter, a prism beam splitter, or equivalent optical elements with specific characteristics for transmitting the wavelength (or range including the wavelength) $\lambda_2$, while reflecting or otherwise blocking the wavelength (or range of wavelengths) specified by $\lambda_1$. The wavelength dependent filter 920 may include a plurality of such elements disposed at one or more positions within the receiving apparatus 900, and is only indicated once for convenience. A set of one or more focusing optics 930 provide efficient collection of the data channel signal beam 745 on a data channel detector 940.

Figure 10:
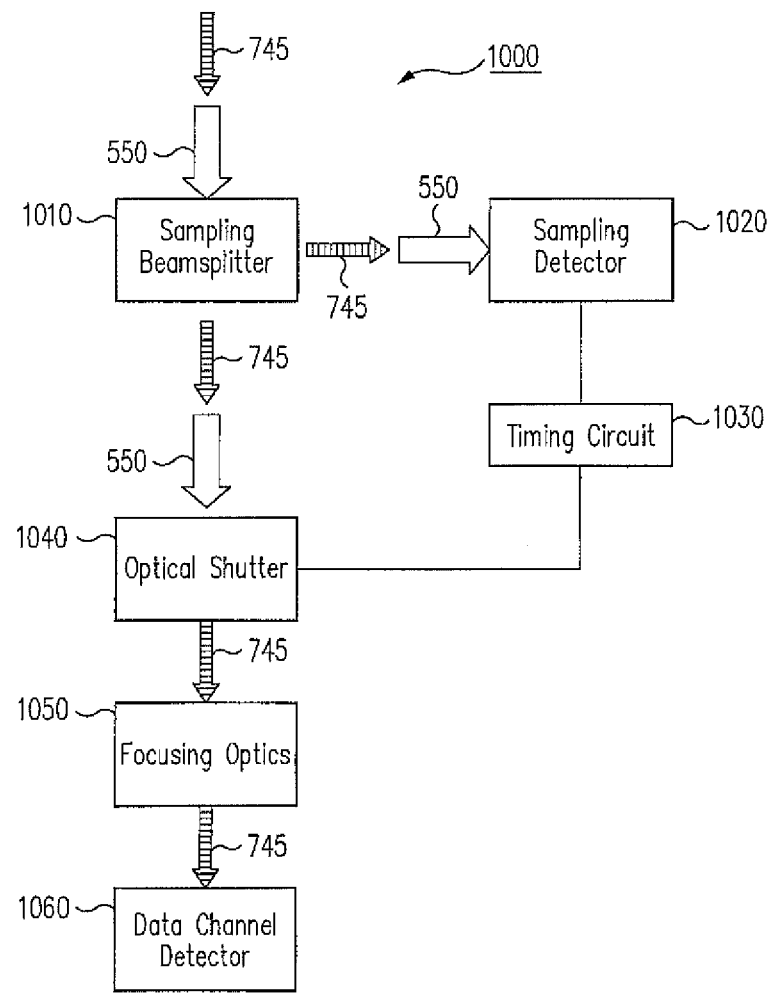
FIG. 10 is a block diagram indicating components of an apparatus for receiving a data signal transmitted through a channel clearing beam, in accordance with the embodiment shown in FIG. 8.

FIG. 10 is a block diagram indicating components of a receiving apparatus 1000 for receiving at a second location data channel signal beam 745 transmitted through channel clearing beam 550, in accordance with the embodiment of the present disclosure shown in FIG. 8. For example, the clearing channel beam 550 and the data channel signal beam 745 may be prepared from the same light source, or from a second light source, but at substantially the same wavelength $\lambda_1$.

As described above, the channel clearing beam 550 and data channel signal beam 745 may be time division multiplexed, and therefore, are not operational simultaneously. A portion of the combined composite beam may be "picked off" with a partial beam splitter 1010. The beam splitter 1010 may be, for example, a neutral density filter of low density to acquire a small portion of the entire beam energy. A beam detector 1020 converts the optical signal received to an electrical signal, which is then processed by a timing circuit 1030 enabled with logic configured to identify a timing pulse that indicates the presence or start of the clearing channel beam 550 as a pulse lasting for a specified time interval. Additional pulses and logic may be included to detect the end of the pulse time interval of the clearing channel beam 550.

By comparison, the small fraction of the data channel signal beam 745 that is also received at the beam detector 1020 may be low enough that it is below a detection/trigger threshold, thus indicating the time interval during which data is being received. The logic circuitry of the timing circuit 1030 may be used to operate an optical shutter 1040 to close when the channel clearing beam 550 is operational, and open when the data channel signal beam 745 is operational. The optical shutter 1040 may include an electro-optic shutter, a liquid crystal shutter, SLMs, AOMs, or mechanical shutters, provided the requirements for response speed to pass the data channel signal beam 745 and block the channel clearing beam 550 may be satisfied.

Numerous advantages may be realized with systems and methods as described above, as well as additional combinations and embodiments of the present disclosure. For example, the reduction of atmospheric attenuation of light using the methods and systems described herein may enable a direct line-of-sight transmission of data between two locations at very high data rates commonly employed in fiber optic transmission—e.g., tens to hundreds of gigabits per second or more. Deployment of such systems and methods may eliminate the need for costly installation of land-line cables.

Furthermore, the channel clearing beam has been described as being co-located at the first location with the source of data channel signal beam and directed toward the second location. However, data may be sent from the second location through the channel clearing beam provided by the first location. Thus, configurations of communication systems may be contemplated (such as "star" networks) where a channel clearing apparatus is not required at all locations, resulting in possibly significant cost savings.

Another benefit may be realized using free space optical transmission for energy distribution via optical power, particularly for specialized applications. For example, electrically driven unmanned aerial vehicles (UAVs) may receive power by transmission from a first location ground location that generates a dynamically projected channel clearing beam through which it supplies optical energy received by solar-panel-type detectors configured on the UAV. Reciprocally, the UAV, as the second location, may transmit data back to the ground station. It may be appreciated that the UAV need not be required to carry fuel or an apparatus for generating the channel clearing beam, and thus may be more efficiently dedicated to its mission.

Embodiments described above illustrate but do not limit the disclosure. It should also be understood that numerous modifications and variations are possible in accordance with the principles of the present disclosure. Accordingly, the scope of the invention is defined only by the following claims.

What is claimed is:

1. A method for clearing obscurants from and communicating data through a communication channel, the method comprising:
    selecting a wavelength for a channel clearing beam of light based on a desired behavior of the obscurants when subjected to optical trapping forces exerted on the particles when irradiated by the channel clearing beam;
    transmitting the channel clearing beam through the channel so as to clear the obscurants from selected portions thereof;
    transmitting a data signal beam of light through the channel; and,
    modulating one or more of the wavelength, polarization, shape, intensity and/or time of occurrence of one or both of the channel clearing beam and the data signal beam such that
    the obscurants are substantially unaffected by the data beam, and
    the channel clearing beam and the data beam are mutually incoherent and/or do not occupy the same portion of the channel at the same time.

2. The method of claim 1, further comprising collimating the channel clearing beam.

3. The method of claim 1, wherein the transmitting of the data signal beam comprises combining the data signal beam with the channel clearing beam.

4. The method of claim 1, wherein the channel clearing beam and the data signal beam have the same wavelengths.

5. The method of claim 1, wherein the channel clearing beam and the data signal beam are transmitted through the channel in the same direction.

6. The method of claim 1, further comprising shaping one or both of the channel clearing beam and the data signal beam such that one or both of the beams respectively exhibits one or both of propagation invariance and self healing.

7. The method of claim 3, wherein the modulating comprises polarizing one or both of the channel clearing beam and the data signal beam such that their respective polarizations are substantially orthogonal to each other.

8. The method of claim 1, wherein the modulating comprises pulsing the channel clearing beam and the data signal beam on an off such that respective pulses of the two beams produced thereby are substantially 180 degrees out of phase with each other.

9. The method of claim 1, wherein the channel clearing beam and the data signal beam are produced by the same light source.

10. The method of claim 1, wherein one or both of the channel clearing beam and the data signal beam comprises coherent light.

11. An apparatus for clearing obscurants from and communicating data through a communication channel, the apparatus comprising:
 a first light source configured to produce a channel clearing beam of light at a wavelength operable to effect a desired behavior of the obscurants when subjected to optical trapping forces exerted on the particles when irradiated by the channel clearing beam;
 a first transmitter for transmitting the channel clearing beam through the channel so as to clear the obscurants from selected portions thereof;
 a second light source configured to produce a data signal beam of light;
 a second transmitter for transmitting the data signal beam through the channel; and,
 a modulator for modulating one or more of the wavelength, polarization, shape, intensity and/or time of occurrence of one or both of the channel clearing beam and the data signal beam such that
 the obscurants are substantially unaffected by the data beam; and,
 the channel clearing beam and the data beam are mutually incoherent and/or do not occupy the same portion of the channel at the same time.

12. The apparatus of claim 11, further comprising a collimator for collimating the channel clearing beam.

13. The apparatus of claim 12, wherein one or both of the first and second light sources comprises a laser.

14. The apparatus of claim 11, wherein the modulator comprises a channel clearing beam shaper and a data signal beam modulator.

15. The apparatus of claim 14, wherein the channel clearing beam shaper comprises a lens, a spatial light modulator (SLM), an acousto-optic deflector (AOD), or an acousto-optic modulator (AOM).

16. The apparatus of claim 15, wherein the lens comprises an axicon.

17. The apparatus of claim 14, wherein the second transmitter comprises a beam combiner.

18. The apparatus of claim 17, wherein the modulator further comprises a beam splitter.

19. The apparatus of claim 18, wherein the modulator further comprises a clock switch.

20. The apparatus of claim 17, further comprising a projector for projecting a combination of the channel clearing beam and the data signal beam.

* * * * *